United States Patent
Mauger

[11] 3,759,242
[45] Sept. 18, 1973

[54] BAR-BE-CUE DEVICE
[76] Inventor: Maurice G. Mauger, 223 Ingall Ave., N.E., Massillon, Ohio 44646
[22] Filed: Nov. 3, 1971
[21] Appl. No.: 195,282

[52] U.S. Cl............... 126/25, 296/23, 126/276
[51] Int. Cl. .................................. A47j 37/07
[58] Field of Search .......... 126/25 R, 276, 41 R; 296/23 R, 22

[56] References Cited
UNITED STATES PATENTS
3,667,449  6/1972  Persinger et al. .............. 126/41
3,558,179  1/1971  Sonet ............................ 296/23
2,862,758  12/1958  Robertson .................... 126/276

Primary Examiner—William F. O'Dea
Assistant Examiner—Paul Devinsky

[57]  ABSTRACT

A retractable bar-be-cue device. This device consists primarily of a telescoping sleeve which may be extended from the trailer or the like. The device carries a flexible tube to which is attached bottled gas within the trailer and the extended end contains the grill portion having an adjustable burner in the lower tube portion thereof.

2 Claims, 2 Drawing Figures

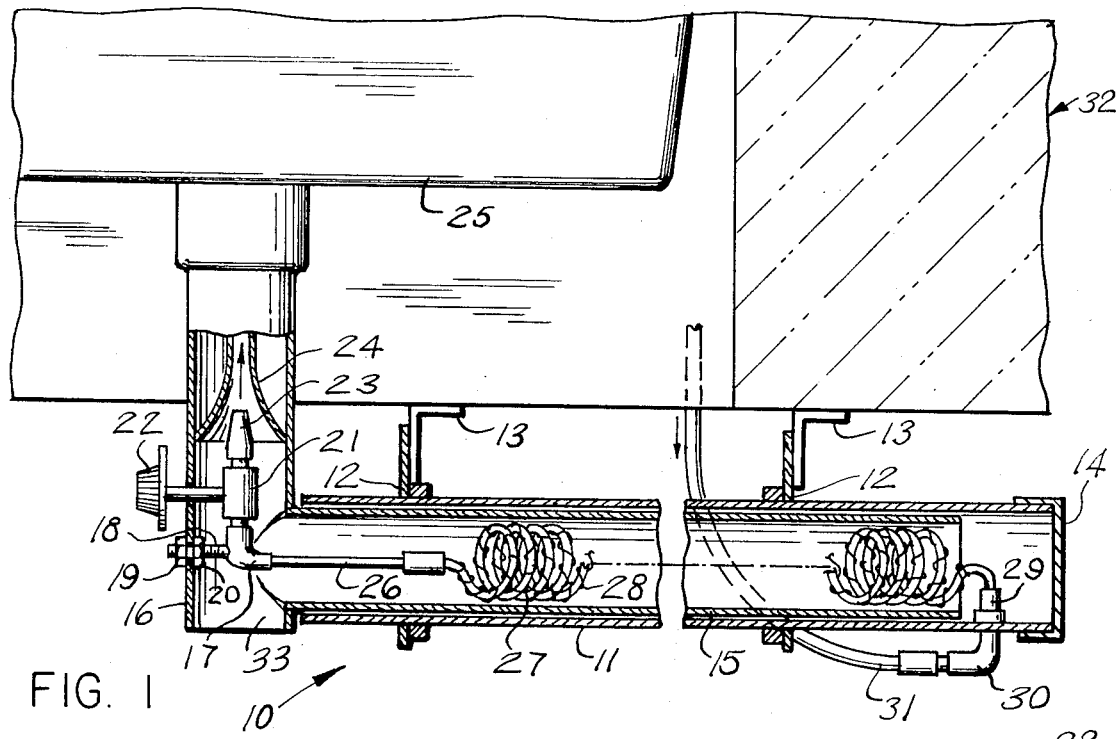
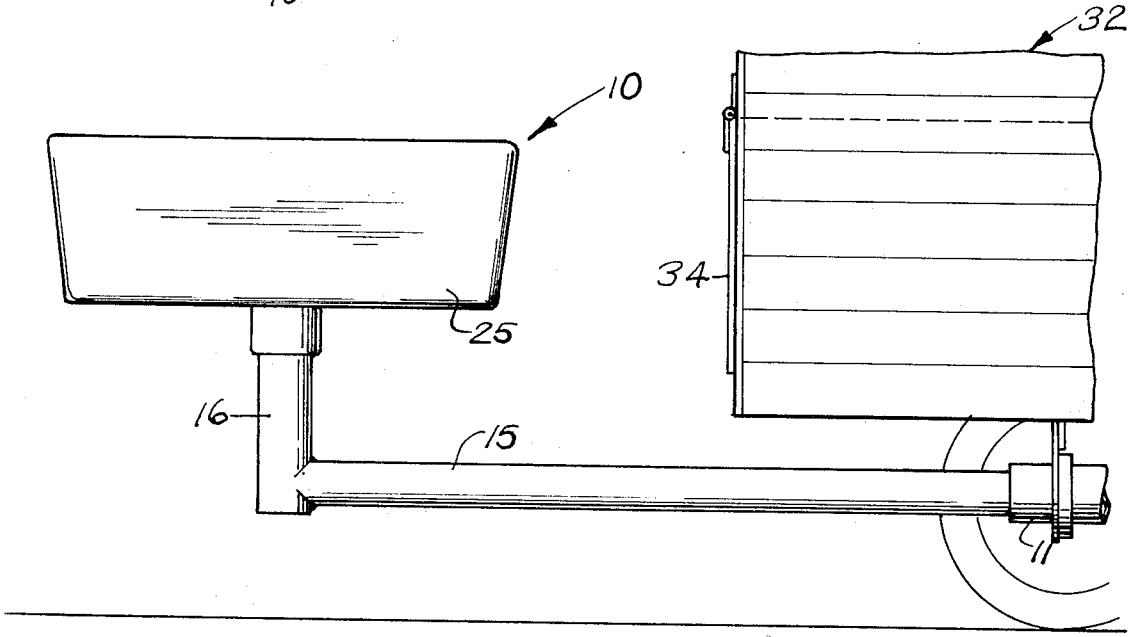
INVENTOR.
MAURICE G. MAUGER

BAR-BE-CUE DEVICE

This invention relates to stove-like devices and more particularly to a bar-be-cue device.

It is therefore the primary purpose of this invention to provide a bar-be-cue device which will be readily extended from a travel trailer and will utilize the bottled gas which is used for other purposes within the trailer.

Another object of this invention is to provide a device of the type described which will include bracket means for mounting it to the trailer, and telescoping sleeve means for extending it outwards from the trailer, the sleeve on the interior of the main sleeve carrying a flexible hose encased in wire so that the two may be telescopingly received within each other without damage to the hose, the hose being connected to the bottled gas on the interior of the travel trailer.

Still another object of this invention is to provide a device of the type described which will have elbow means and pipe means attached to the flexible tube, the elbow having stud means for securing it to a vertical pipe attached to the grill portion of the device.

Yet another object of this invention is to provide a device of the type described which will have control guide means to meet the jet, the jet being partially received in the center of a flared tube and the lower portion of the tube beneath the grill portion will have air inlet opening means in order to support combustion of the gas which will be used for cooking the meat or the like.

Other objects of the present invention are to provide a bar-be-cue device which is simple in design, inexpensive to manufacture, rugged in construction, easy to use and efficient in operation.

These and other objects will become readily evident upon a study of the following specification together with the accompanying drawing wherein:

FIG. 1 is a side view of the present invention shown partly broken away; and

FIG. 2 is a similar view showing the device in its fully extended position for cooking purposes.

According to this invention, a bar-be-cue device 10 is shown to include an elongated sleeve 11 having brackets 12 thereon, which are secured to L-shaped brackets 13 for mounting purposes. One end of sleeve 11 is a cap member 14 secured thereto by bolt fasteners or other suitable means (not shown). The opposite end of sleeve 11 is open and telescopingly receives a sleeve 15 which is welded at right angles to a sleeve 16. Carried within sleeve 16 is an elbow 17 having an extending stud 18 which threadingly receives nut fasteners 19 and 20 which render elbow 17 secure within sleeve 16. A valve 21 at the upper extremity of elbow 17 is provided with an external knob 22 which provides adjustment means for the gas being egressed from nozzle 23 within the flared tube 24 extending from the grill portion 25 of device 10. Threadingly carried at the opposite end of elbow 17 is a pipe 26 which is secured in a suitable manner to a flexible plastic tube 27 which is encased within wire 28 in order that it may extend or contract while not rubbing against the inner periphery of sleeve 15. The tube 27 is attached at its opposite end to fitting 29 which is threadingly carrying an elbow 30. Secured to elbow 30 is a flexible tube 31 which extends from a pressurized gas bottle (not shown) on the interior of trailer 32.

It shall be noted that the gas bottle within the trailer 32 is used for purposes on the interior of trailer 32 in a well known manner, however, device 10 enables the same bottle to be used to supply gas to the nozzle 23 for use with the grill portion 25 of device 10. The lower end of sleeve 16 of device 10 is provided with an opening 33 for the purpose of enabling atmospheric air to enter to support combustion of the gas coming from the nozzle 23.

In use, door 34 is opened of trailer 32 and device 10 is urged telescopingly outwards from the support sleeve 11 and thus enables the user to quickly bar-be-cue foods.

What I claim is:

1. A telescoping barbecueing device for travel trailers, comprising an elongated sleeve, a pair of brackets carried by said sleeve providing support means for said sleeve by being secured to a pair of brackets secured to said trailer, a telescoping sleeve carried within said elongated sleeve secured to said trailer providing a means of extending a grill portion of said device outwards from said trailer, a wire encircled plastic tube carried within said telescoping tube providing passageway means for gas contained in a gas bottle on the interior of said trailer, a pipe and an elbow member carried within said device with valve means for controlling a gas jet used to burn said gas for cooking food within said grill portion of said device and a threaded stud carrried by said device for mounting said valve, said elbow, and said jet in a rigid position.

2. A telescoping barbecuing device comprises an elongated main sleeve secured to a pair of brackets of a trailer, said main sleeve being provided with an internal fitting for securing a flexible and wire encased tube on the interior of said main sleeve and said fitting is secured to an elbow external of said main sleeve so as to enable a flexible hose of a gas bottle within said trailer to be secured to said elbow in order to provide gas for cooking within said device, the tubing of said device being wire encased so that it may be extended or contracted without wear due to the wire being engaged slidably with the inner periphery of said telescoping tube, the wire protecting said tube from ware, and pipe means secured to the end of said flexible tube is threadably carried within said elbow within a sleeve welded to said telescoping tube, said tube welded thereto, is secured in a suitable manner to the grill portion of said device and a threaded stud extending from the elbow of said tube of said grill portion provides a means of rendering the jet, the valve and the elbow stationary, said stub extending through the wall of said tube containing said valve and said jet, said stud carrying threaded nut fastners, one externally and one internally, so as to render said valve, said elbow and said jet stationary, a knob carried by said valve providing control means for the amount of gas being egressed from the nozzle of said jet, said nozzle being partially enclosed within a flared tube within said tube welded to said telescoping tube and carried by said grill portion and the opposite end of said tube welded thereto, is opened so as to enable air at atmospheric pressure to enter so as to support combustion of said gas when cooking, and when said device is not in use it is telescoping urged rearward into said main sleeve secured to said trailer, and said device comprises a barbecue and trailer combination.

* * * * *